(12) United States Patent
Hill

(10) Patent No.: US 6,584,516 B1
(45) Date of Patent: *Jun. 24, 2003

(54) HIGH-SPEED SERVO DATA INTERFACE SYSTEM

(75) Inventor: John P. Hill, Nederland, CO (US)

(73) Assignee: STMicroelectronics N.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/703,260

(22) Filed: Oct. 31, 2000

Related U.S. Application Data

(63) Continuation of application No. 09/027,268, filed on Feb. 20, 1998, now Pat. No. 6,163,814.
(60) Provisional application No. 60/066,701, filed on Nov. 25, 1997.

(51) Int. Cl.[7] .......................... G06F 13/00; G11B 5/596
(52) U.S. Cl. .......................... 710/33; 360/77.08; 710/7
(58) Field of Search .............................. 710/65, 69, 7, 710/33, 35, 73; 360/29, 51, 67, 77.02, 77.05, 77.08, 46, 41

(56) References Cited

U.S. PATENT DOCUMENTS

| | | | |
|---|---|---|---|
| 4,477,755 A | * 10/1984 | Rickert | 318/611 |
| 5,027,233 A | 6/1991 | Berti et al. | 360/77.02 |
| 5,262,907 A | * 11/1993 | Duffy et al. | 360/77.05 |
| 5,341,249 A | 8/1994 | Abbott et al. | 360/46 |
| 5,586,306 A | * 12/1996 | Romano et al. | 360/77.08 |
| 5,612,833 A | 3/1997 | Yarmchuk et al. | 360/75 |
| 5,659,436 A | 8/1997 | John | 360/75 |
| 5,668,678 A | * 9/1997 | Reed et al. | 360/51 |
| 5,684,651 A | * 11/1997 | Yaegashi et al. | 360/77.08 |
| 5,684,972 A | 11/1997 | Hill et al. | 395/404 |
| 5,726,821 A | 3/1998 | Coke et al. | 360/67 |
| 5,793,556 A | 8/1998 | Freitas et al. | 360/11.08 |
| 5,801,896 A | 9/1998 | Freitas | 360/77.08 |
| 5,844,744 A | 12/1998 | Suzuki et al. | 360/78.09 |
| 5,854,714 A | * 12/1998 | Reed et al. | 360/51 |
| 5,907,447 A | 5/1999 | Yarmchuk et al. | 360/75 |
| 5,956,196 A | 9/1999 | Hull et al. | 360/35 |
| 5,978,752 A | 11/1999 | Morris | 702/186 |
| 5,987,542 A | * 11/1999 | Bang | 710/65 |
| 6,111,717 A | * 8/2000 | Cloke et al. | 360/67 |
| 6,144,513 A | * 11/2000 | Reed et al. | 360/51 |
| 6,163,419 A | * 12/2000 | Sobey et al. | 360/29 |
| 6,163,814 A | * 12/2000 | Hill | 710/1 |
| 6,172,828 B1 | * 1/2001 | Tsunoda et al. | 360/46 |
| 6,278,568 B1 | * 8/2001 | Cloke et al. | 360/51 |

* cited by examiner

Primary Examiner—Thomas Lee
Assistant Examiner—Chun Cao
(74) Attorney, Agent, or Firm—Lisa K. Jorgenson; William J. Kubida

(57) ABSTRACT

The invention provides a high-speed interface that transfers servo position data from the read channel integrated circuit to the drive control integrated circuit or another integrated circuit. The high-speed interface eliminates the need for analog pins on the integrated circuits to lower the cost of the system. The high-speed interface also eliminates the use of the serial interface to transfer the servo position data which speeds up the data transfer. Examples of servo position data include high-resolution servo position data and coarse-resolution servo position data. A read channel integrated circuit transfers the user data and the high-resolution servo position data to a data bus, such as an NRZ bus. The data bus transfers the user data and the high-resolution servo position data to another integrated circuit, such as a drive control integrated circuit. The other integrated circuit receives the user data and the high-resolution servo position data from the data bus. The coarse-resolution servo position data can also be transferred over the data bus.

20 Claims, 5 Drawing Sheets

HIGH-SPEED SERVO DATA INTERFACE SYSTEM

RELATED APPLICATION

This application is a continuation of U.S. application Ser. No 09/027,268, filed Feb. 20, 1998, U.S. Pat. No. 6,163,814, which claims the benefit of U.S. provisional patent application No. 60/066,701 filed on Nov. 25, 1997, both of which are specifically incorporated herein by reference.

FIELD OF THE INVENTION

The invention is related to the field of disk drive systems, and in particular, to a high-speed interface that transfers user data and servo data from a read channel integrated circuit to another integrated circuit.

Problem

A magnetic disk system stores user data in data tracks on the surface of a disk device. The user data is transferred between the disk and the user as follows. A head is positioned over a circular data track and reads the user data from the data track as the disk spins. The head transfers the user data to a pre-amp, and the pre-amp transfers the user data to a read channel integrated circuit. The read channel integrated circuit processes the user data and transfers the user data to a drive control integrated circuit over a high speed bus, such as a Non-Return to Zero (NRZ) bus. The drive control integrated circuit transfers the user data to the user.

The magnetic disk system also stores servo position data in servo sectors on the surface of the disk device. The servo sectors are interspersed along the circular data tracks so that the head periodically encounters the servo sectors as the disk spins. When the heads are positioned over a servo sector, they transfer servo data and not user data. When the heads are positioned over a data sector with user data, they transfer user data and not servo data.

A servo system uses the servo data to position a read/write head over a data track that contains the desired user data. One form of servo position data is coarse-resolution data that identifies the data track that is under the head. Coarse-resolution data has a resolution of one track and does not have the resolution to center the head over the data track. The other form of servo position data is high-resolution data that indicates how far off-center a head is relative to the data track. The servo system uses the coarse-resolution data to position a head near the proper data track and uses the high-resolution data to center the head over the center of that track. The servo system must have the servo position data to effectively store or retrieve user data.

Servo position data is transferred from the disk to the servo system as follows. A read/write head reads the servo position data from the disk device. The read/write head transfers the servo position data through a pre-amp to a read channel integrated circuit. The read channel integrated circuit processes the servo position data and transfers the processed data to a drive control integrated circuit. A processor in the drive control integrated circuit uses the servo position data to direct the servo system to position the head.

One prior system for transferring servo position data from the disk to the processor uses dedicated analog connections to transfer the high-resolution data from the read channel integrated circuit to the drive control integrated circuit. The analog lines require dedicated pins on each integrated circuit that increase the cost of the integrated circuits, and the corresponding cost of the disk drive systems that incorporate the integrated circuits. The course-resolution data is transferred from the read channel integrated circuit to the drive control integrated circuit by lines that transmit a representation of the data pulses in the coarse-resolution servo data field. These lines are sometimes referred to as pulse/polarity lines.

Another prior system for transferring servo position data from the disk to the processor uses the read channel integrated circuit to convert the high-resolution data from analog to digital. This prior system then transfers the high-resolution data over a serial interface between the read channel integrated circuit and the drive control integrated circuit. Although, the course-resolution data is still transferred by the pulse/polarity lines, it could be decoded in the read channel integrated circuit and transferred to the drive control integrated circuit over the serial interface. The serial interface can be slow given the typical baud rate and the increase in the amount of servo position data. Unfortunately, the slow speed of the serial interface may limit the accurate positioning of the head to read or write data. The slow speed of the serial interface also limits the ability of the servo system to follow high-density data tracks that increase drive capacity. In addition, it is undesirable to transfer data over the serial interface while data is being read due to signal to noise issues.

At present, there is a need for a more efficient system to transfer servo position data from the read channel integrated circuit to the drive control integrated circuit. Such a system should transfer the servo position data at high speeds and should eliminate the analog pins on the integrated circuits.

Solution

The invention overcomes the above problems by providing a high-speed interface that transfers servo position data from the read channel integrated circuit to the drive control integrated circuit. The high-speed interface eliminates the need for analog pins on the integrated circuits to lower the cost of the system. The high-speed interface also eliminates the use of the serial interface to transfer the servo position data which speeds up the data transfer and leaves the serial interface with more capacity for other communications.

The invention includes methods, systems, and integrated circuits for transferring user data and servo position data in a disk drive system. Examples of servo position data include high-resolution servo position data and coarse-resolution servo position data. A read channel integrated circuit transfers the user data and the high-resolution servo position data to a data bus, such as an NRZ bus. The data bus transfers the user data and the high-resolution servo position data to another integrated circuit, such as a drive control integrated circuit. The other integrated circuit receives the user data and the high-resolution servo position data from the data bus.

The read channel integrated circuit is able to transfer servo data over the data bus when the head is positioned over a servo sector because user data is not being transferred over the data bus during this period. Using the same high-speed data bus that transfers user data to also transfer servo position data represents a distinct advance in the art. Use of this bus to transfer servo position data speeds up the data transfer and eliminates the need for analog pins.

The invention has various embodiments and each of the following limitations is not required in each embodiment. A disk stores the user data and the servo position data. A head reads the user data and the servo position data from the disk and transfers the servo position data to a pre-amp. The pre-amp transfers the user data and the servo position data to a read channel integrated circuit. The read channel integrated circuit demodulates the servo position data and the servo bursts that represent the high-resolution servo position data. The read channel integrated circuit converts the high-resolution servo position data from analog to digital. The read channel integrated circuit separates the digital high-resolution servo position data into servo position data words and stores the data words in a memory.

The read channel integrated circuit multiplexes the user data and the servo position data words and transfers the multiplexed data to the data bus. The data bus transfers the multiplexed data to the other integrated circuit. The servo position data is transferred when the disk drive system is not reading or writing user data. The read channel integrated circuit may also decode the coarse-resolution servo position data and separate it into the servo position words along with the high-resolution servo position data. In this case, the coarse-resolution servo position data is also transferred over the data bus.

The other integrated circuit de-multiplexes the user data and the servo position data words. The other integrated circuit combines the servo position data words into the servo position data and stores the servo position data in memory. The other integrated circuit uses the servo position data to control positioning of a head relative to a disk device. The other integrated circuit also transfers the user data to the user.

DETAILED DESCRIPTION

Figure 1:
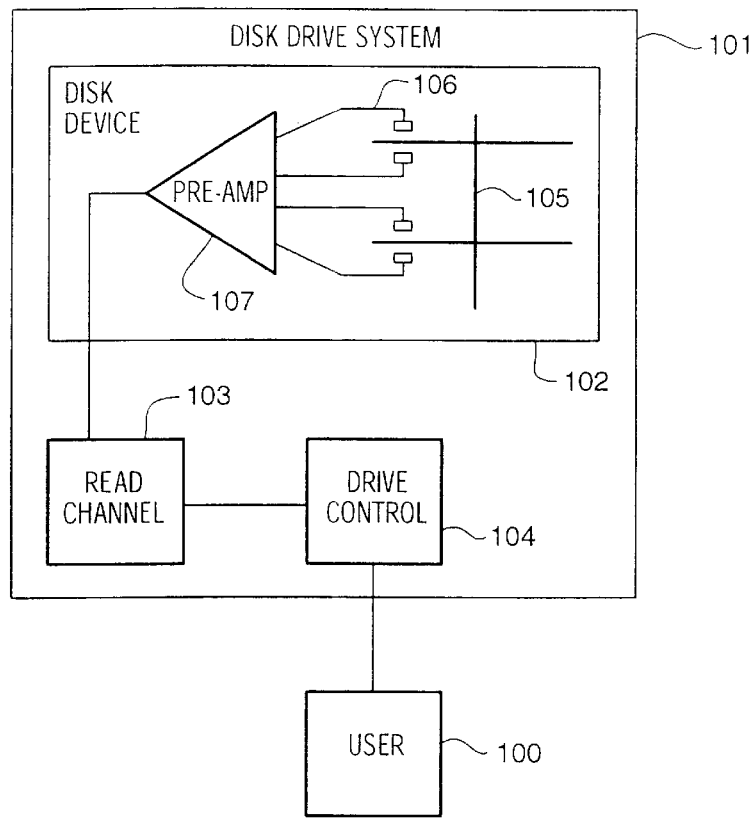
FIG. 1 is a block diagram of a version of the invention and depicts a disk drive system.

System Configuration and Operation—FIG. 1

FIG. 1 depicts a user 100 that is coupled to a disk drive system 101. The user 100 stores and retrieves user data from the disk drive system 101. One example of the user 100 is a personal computer. The disk drive system 101 includes a disk device 102 that is coupled to a read channel integrated circuit 103. The read channel integrated circuit 103 is coupled to a drive control integrated circuit 104, and the drive control integrated circuit 104 is coupled to the user 100. Those skilled in the art appreciate that some conventional elements of the disk drive system 101 have been omitted for reasons of clarity.

The disk device 102 is comprised of disks 105, heads 106, and a pre-amp 107. The heads 106 read and write data to the disks 105. The pre-amp 107 connects one of the heads to the read channel integrated circuit 103. The disk device 102 is conventional and can be the model #WNR31601A supplied by Samsung.

The read channel integrated circuit 103 provides the system interface to the heads 106 of the disk device 102. When data is written, the read channel integrated circuit 103 encodes the data and transfers the data to one of the heads 106 through the pre-amp 107. When data is read, the read channel integrated circuit 103 receives a read signal from one of the heads 106 through the pre-amp 107. The read channel integrated circuit 103 separates the user data and the servo position data in the read signal for individual processing. After the processing, the read channel integrated circuit 103 multiplexes the user data and the servo position data onto a data bus for transfer to the drive control integrated circuit 104. The read channel integrated circuit 103 could be adapted from the model #ADRT 1000 supplied by Analog Devices. The data bus could be a high-speed Non-Return to Zero (NRZ) bus.

The drive control integrated circuit 104 controls the operation of the disk drive system 101. The drive control integrated circuit 104 controls the position of the heads 106 relative to the disks 105. The drive control integrated circuit 104 controls the data transfer between the user 100 and the disk drive system 101. The drive control integrated circuit 104 is used in some embodiments of the invention, but those skilled in the art are aware that the functionality of the drive control integrated circuit 104 can be distributed among multiple inter-connected integrated circuits. The invention is not restricted to the use of a single drive control integrated circuit 104, but also encompasses the use of a configuration of integrated circuits that interface with the read channel integrated circuit to 103 to transfer user data and servo position data over a data bus.

The drive control integrated circuit 104 de-multiplexes the user data and the servo position data from the data bus. The drive control integrated circuit 104 distributes the user data to the user 100 and the servo position data to the appropriate processing functions in the drive control integrated circuit 104. The drive control integrated circuit 104 can be adapted from the AIC-5460 supplied by Adaptec of Milipitas, Calif.

In operation, the user 100 stores and retrieves user data as follows. The user 100 transfers the user data to the drive control integrated circuit 104. The drive control integrated circuit 104 transfers the user data to the read channel integrated circuit 103 over a data bus. The drive control integrated circuit 104 uses servo position data to direct the positioning of the heads 106 to the proper location on the disks 105 for user data storage. The read channel integrated circuit 103 encodes the user data and transfers the user data to the pre-amp 107. The pre-amp 107 transfers the user data to one of the heads 106 that is selected by the drive control integrated circuit 104. The selected head writes the user data to the data track on the disks 105 that is positioned under the head.

To retrieve the user data, the selected head 106 is re-positioned over the data track on the disks 105 under the control of the drive control integrated circuit 104. The head reads the user data and the servo data that is under the head and transfers the data to the pre-amp 107. The pre-amp 107 transfers the data from the selected head to the read channel integrated circuit 103. The read channel integrated circuit 103 separates the user data and the servo position data. The read channel integrated circuit 103 demodulates and decodes the separated user data and servo position data. The read channel integrated circuit 103 multiplexes the processed user data and servo position data onto a common data bus for transfer to the drive control integrated circuit 104. The drive control integrated circuit 104 de-multiplexes the user data and the servo position data from the data bus. The drive control integrated circuit 104 distributes the user data to the user 100 and distributes the servo position data to the appropriate processing functions in the drive control integrated circuit 104.

Figure 2:
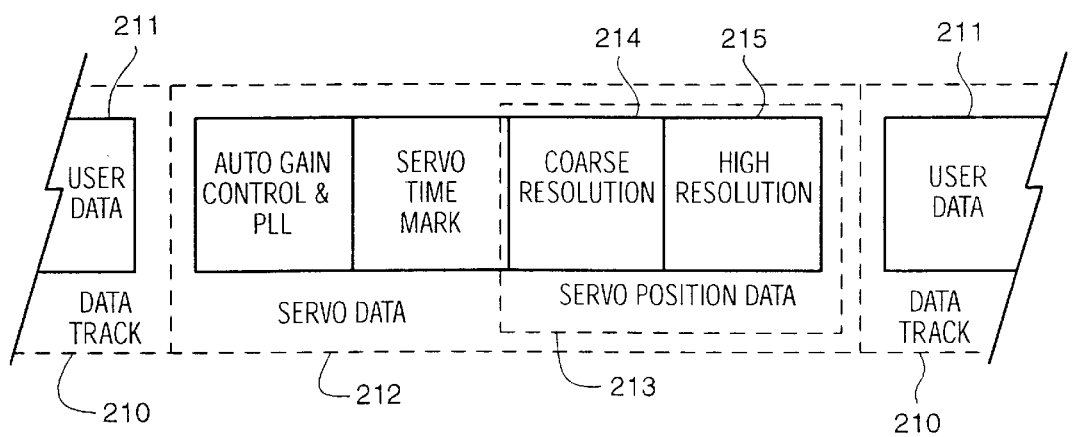
FIG. 2 is a block diagram of a servo sector.
Figure 3:
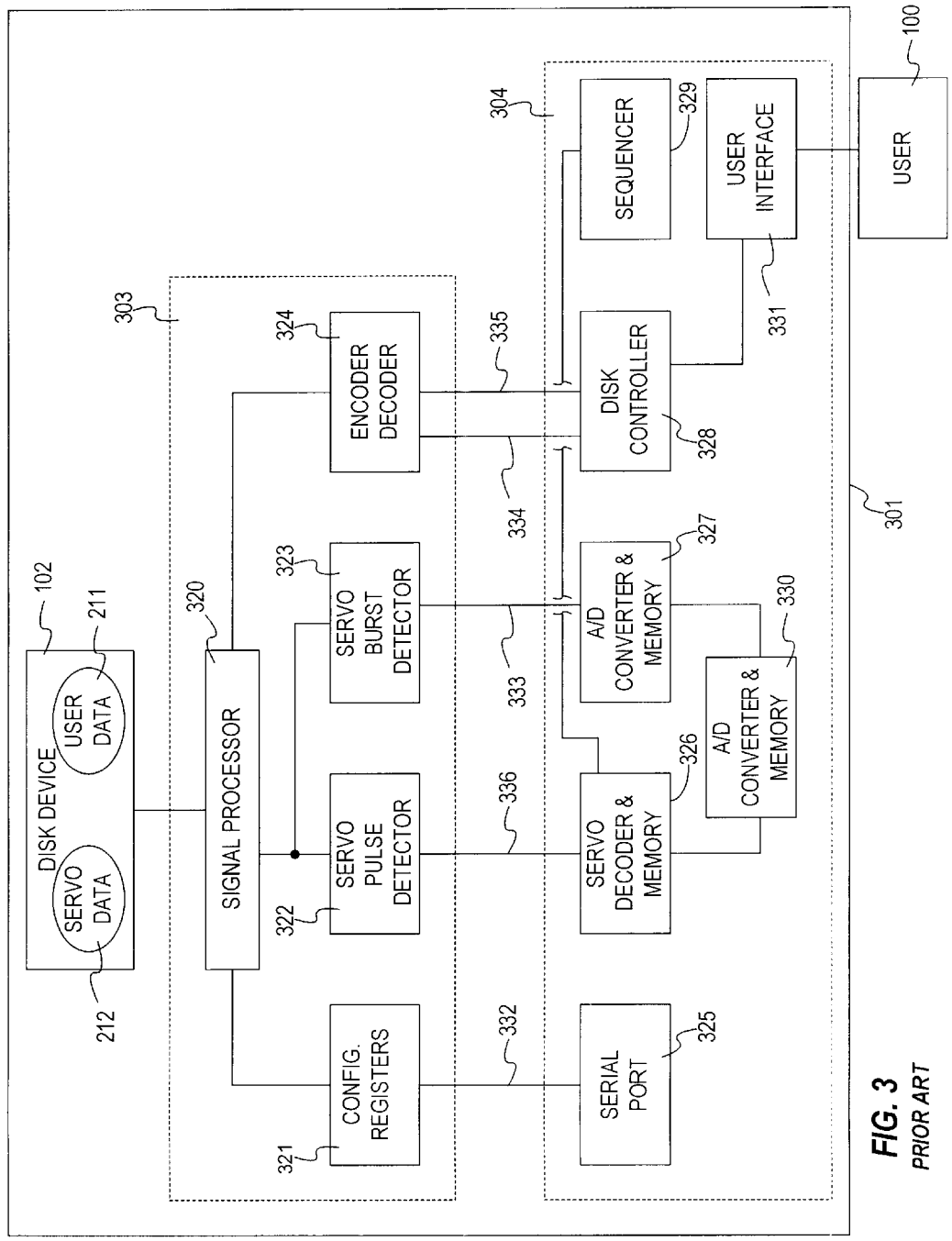
FIG. 3 is a block diagram of a known read channel integrated circuit and drive control integrated circuit.
Figure 4:
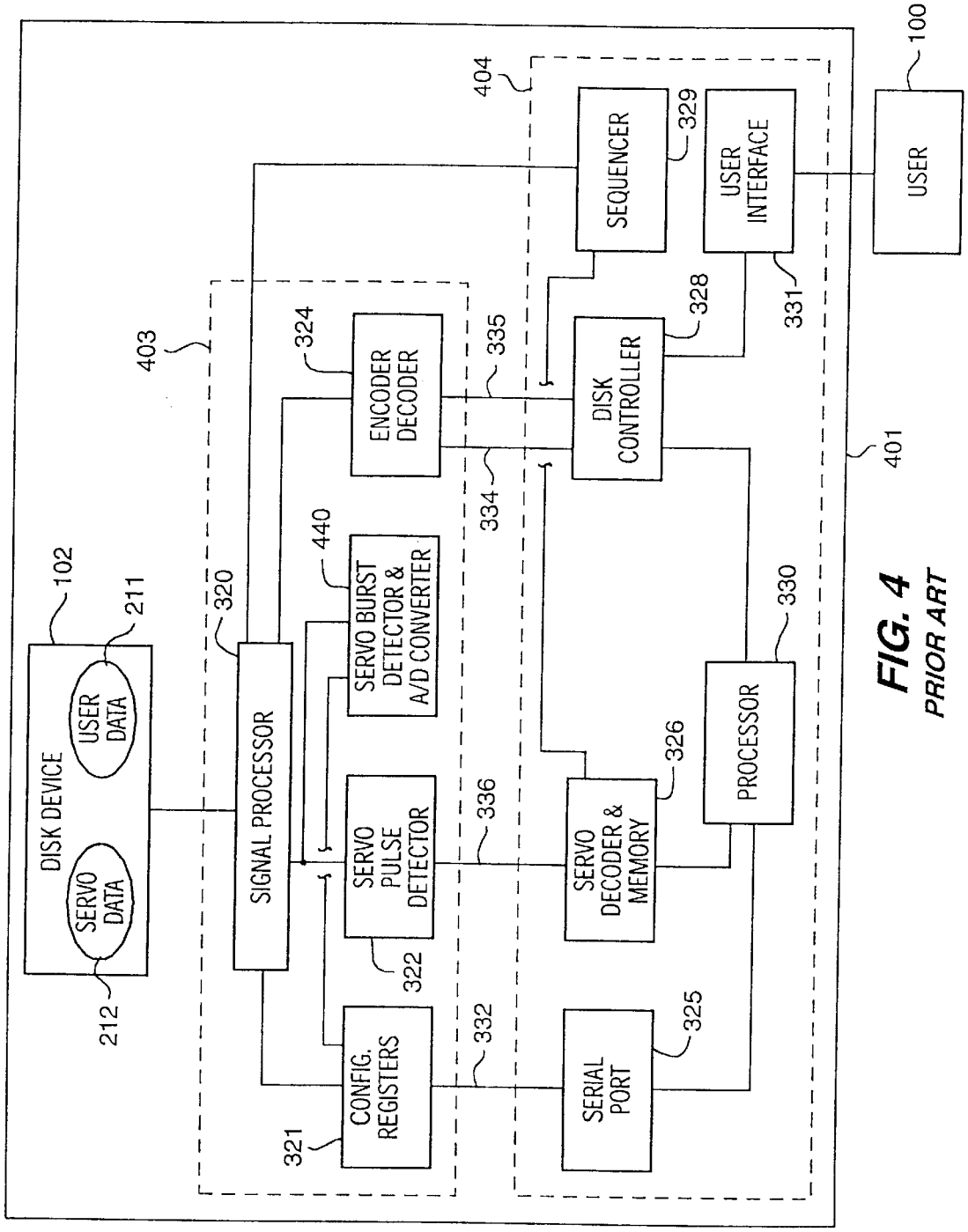
FIG. 4 is a block diagram of a known read channel integrated circuit and drive control integrated circuit.

Underlying Technology—FIGS. 2–4

FIG. 2 depicts servo data 212 that is interspersed in a data track 210 that contains user data 211. The user data 211 is the information that a user of a disk drive system typically stores on the disk drive system. Examples of the user data 211 include application software, document files, and records. A number of servo sectors that contain such servo data are periodically interspersed along the data tracks of a disk drive system. The servo data 212 contains automatic gain control information, phase-locked loop timing information, and a servo timing mark. The servo data 212 also contains servo position data 213 that is comprised of coarse-resolution data 214 and high-resolution data 215. The coarse-resolution data 214 are pulses that are typically encoded using the Grey Code and identify the data track 210. The coarse-resolution data 214 has a resolution of one track and does not lo have the resolution to center the head over the data track 210. The high-resolution data 215 is comprised of servo bursts that indicate how far off-center a head is relative to the data track 210. The servo system uses the coarse-resolution data 214 to position a head near the data track 210 and uses the high-resolution data 215 to center the head over the center of the data track 210.

FIG. 3 depicts a disk drive system 301 that is known in the art. The disk device 102 contains the user data 211 and the servo data 212. The read channel integrated circuit 303 comprises signal processor 320, configuration registers 321, servo pulse detector 322, servo burst detector 323, and encoder/decoder (endec) 324. The drive control integrated circuit 304 comprises serial port 325, servo decoder and memory 326, analog-to-digital (A/D) converter and memory 327, disk controller 328, sequencer 329, processor 330, and user interface 331. The read channel integrated circuit 303 and the drive control integrated circuit 304 are connected by a serial interface 332, analog lines 333, clock signal 334, NRZ bus 335, and pulse/polarity lines 336.

In operation, the signal processor 320 receives a read signal that contains the user data 211 and the servo data 212 from the disk device 102. The signal processor 320 transfers the user data 211 to the endec 324. The endec 324 transfers the user data 211 to the disk controller 328 over the NRZ bus 335. The disk controller 328 forwards the user data 211 to the user 100 though the user interface 331. The user data 211 is transferred from the user 100 to the disk device 102 in a reciprocal manner.

The signal processor 320 transfers the servo data 212 to the servo pulse detector 322, and the servo pulse detector 322 detects the pulses comprising the coarse-resolution servo position data in the servo data 212. The servo pulse detector 322 transfers the coarse-resolution servo position data over the pulse/polarity lines 336 to the servo decoder and memory 326. The servo decoder and memory 326 decodes the coarse-resolution servo position data and stores it in memory. The processor 330 obtains the decoded coarse-resolution servo position data from the servo decoder and memory 326 and uses the coarse-resolution servo position data to position the heads near the desired data tracks.

The signal processor 320 transfers the high-resolution servo position data to the servo burst detector 323. The servo burst detector 323 detects the amplitudes of the servo bursts in the high-resolution servo position data using analog peak detection, analog area detection, or variations of these well-known methods. The servo burst detector 323 transfers the amplitude information over the analog lines 333 to the A/D converter and memory 327. The A/D converter and memory 327 converts the high-resolution servo position data from analog-to-digital and stores the digital data in memory. The processor 330 obtains the high-resolution servo position data from the A/D converter and memory 327 and uses the high-resolution servo position data to center the heads over the desired data tracks.

The processor 330 provides configuration information to the read channel integrated circuit 303. The configuration information contains settings and variables that control the operation of read channel integrated circuit 303. The processor 330 transfers the configuration information to the serial port 325 for transfer over the serial interface 332 to the configuration registers 321. The signal processor 320 reads the configuration information from the configuration registers 321 and operates accordingly.

The sequencer 329 receives timing information from the servo decoder and memory 326 over the line 337. The timing information is derived from the phase-locked-loop field and servo timing mark in the servo data. The sequencer 329 uses the timing information to provide a signal to the signal processor 320. The signal indicates when the disk device 102 is reading or writing the user data 211 and when the disk device 102 is reading the servo data 212. The heads do not transfer the user data 211 when they are positioned over the servo data 212. Likewise, the heads do not transfer the servo data 212 when they are positioned over the user data 211. As a result, the NRZ bus 335 does not transfer the user data 211 when the disk device 102 is reading the servo data 212.

FIG. 4 depicts another disk drive system 401 that is known in the art. The disk drive system 401 is a modified version of the disk drive system 301 of FIG. 3. The analog lines 333 and the A/D converter and memory 327 of FIG. 3 have been removed. The servo burst detector 323 and the AND converter and memory 327 from FIG. 3 are combined into a servo burst detector and A/D converter element 440. The read channel integrated circuit 403 now converts the high-resolution servo position data from analog-to-digital in the element 440 and transfers the digital high-resolution servo position data to the configuration registers 321. The processor 330 obtains the high-resolution servo position data over the serial interface 332 and through the serial port 325. The element 440 either detects analog servo bursts and converts the results to digital information, or the element 440 over-samples the servo bursts with an A/D converter and uses a digital signal processor to detect the servo bursts from the digital signal produced by the over-sampling.

Although not depicted on FIG. 4, the disk drive system 401 could be further modified by removing the servo decoder and memory 326 and integrating its functionality into the servo pulse detector 322. The servo pulse detector 322 would then transfer the coarse-resolution data to the configuration registers 321. The processor 330 would obtain both the coarse-resolution and high-resolution servo position data over the serial interface 332 and through the serial port 325.

Figure 5:
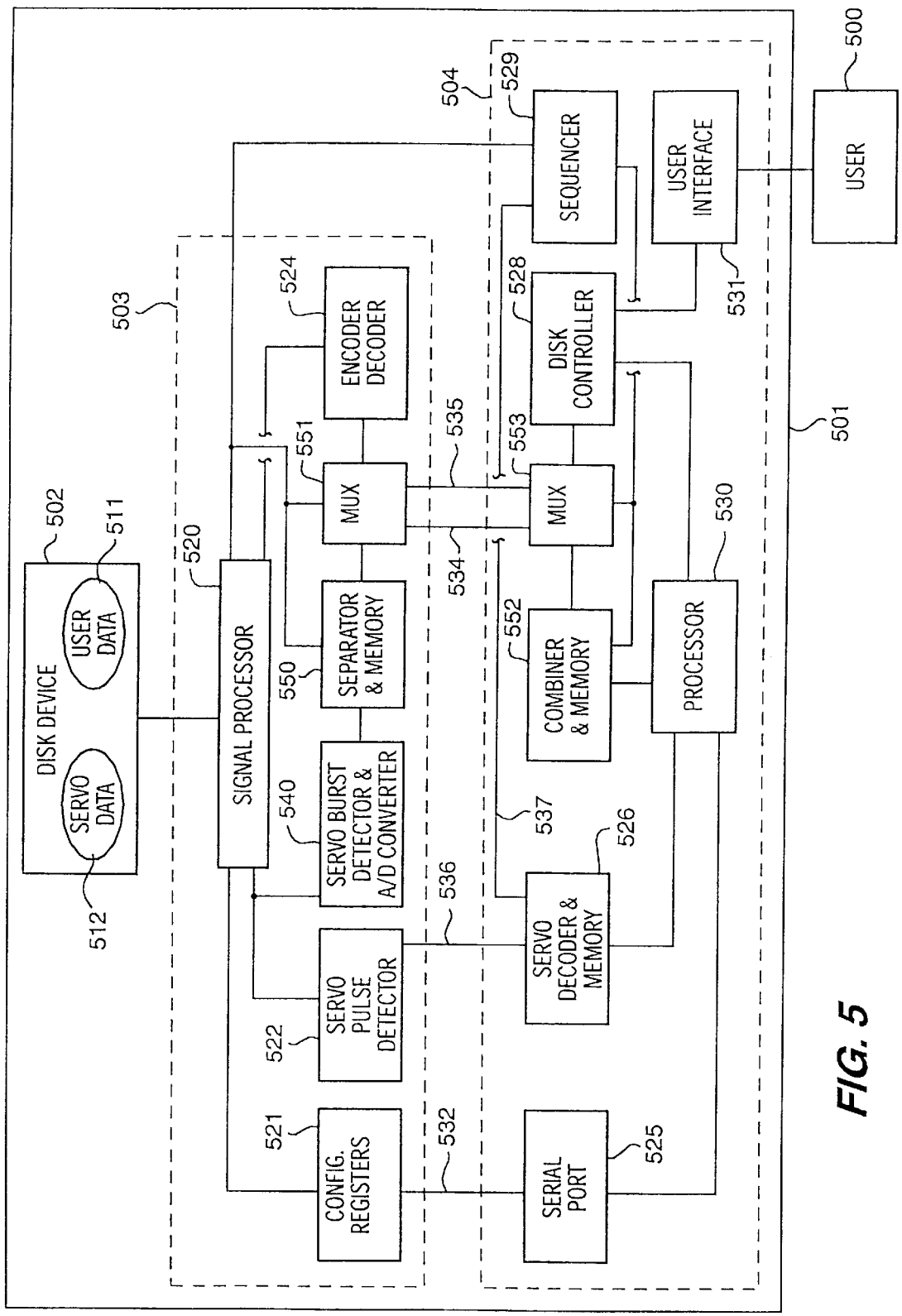
FIG. 5 is a block diagram of a version of the invention and depicts a read channel integrated circuit and a drive control integrated circuit.

High-Speed Transfer of High-Resolution Servo Position Data—FIG. 5

FIG. 5 depicts the user 500 coupled to a disk drive system 501 that is configured in accord with the present invention. Components that are similar to those described above retain the same last two digits of the reference number. The disk drive system 501 transfers the servo data 512 over the high-speed NRZ bus 535. The use of the high-speed NRZ bus 535 eliminates the need for costly analog pins to transfer the high-resolution servo position data. The high-speed NRZ bus 535 transfers the high-resolution servo position data faster than the serial interface 532 to improve system performance.

The disk device 502 stores user data 511 and servo data 512. The read channel integrated circuit 503 comprises signal processor 520, configuration registers 521, servo pulse detector 522, servo burst detector and A/D converter element 540, separator and memory 550, multiplexer (mux) 551, and endec 524. The drive control integrated circuit 504 comprises serial port 525, servo decoder and memory 526, combiner and memory 552, mux 553, disk controller 528, sequencer 529, processor 530, and user interface 531. The read channel integrated circuit 503 and the drive control integrated circuit 504 are connected by a serial interface 532, clock signal 534, NRZ bus 535, and pulse/polarity lines 536.

In operation, the signal processor 520 receives a read signal that contains the user data 511 and the servo data 512 from the disk device 502. The signal processor 520 transfers the user data 511 to the endec 524. The endec 524 transfers the user data 511 to the mux 551. When the disk device 502 is reading the user data 511, the mux 551 transfers the user data 511 to the mux 553 over the NRZ bus 535. The mux 553 transfers the user data 511 to the disk controller 528. The disk controller 528 forwards the user data 511 to the user 500 though the user interface 531. The user data 511 is transferred from the user 500 to the disk device 502 in a reciprocal manner where the mux 553 transfers the user data 511 to the mux 551 over the NRZ bus 535 when the disk device 502 is writing the user data 511.

The signal processor 520 transfers the servo data 512 in the read signal to the servo pulse detector 522. The servo pulse detector 522 detects the pulses comprising the coarse-resolution servo position data in the servo data 512. The servo pulse detector 522 transfers the coarse-resolution servo position data over the pulse/polarity lines 536 to the servo decoder and memory 526. The servo decoder and memory 526 decodes the coarse-resolution servo position data and stores it in memory. The processor 530 obtains the decoded coarse-resolution servo position data from the servo decoder and memory 526 and uses the coarse-resolution servo position data to position the heads near the desired data tracks.

The signal processor 520 transfers the high-resolution servo position data to the servo burst detector and A/D converter element 540. The element 540 either detects analog servo bursts and converts the results to digital information, or the element 540 over-samples the servo bursts with an A/D converter and uses a digital signal processor to detect the servo bursts from the digital signal produced by the over-sampling. In either case, the element 540 transfers the digital high-resolution servo position data to the separator and memory 550. The separator and memory 550 separates the digital high-resolution servo position data into data words that are the width of the NRZ bus 535 and stores the data words in a memory.

The mux 551 obtains the data words containing the high-resolution servo position data from the separator and memory 550. The mux 551 transfers the high-resolution servo position data words to the mux 553 over the NRZ bus 535 when the disk device 502 is reading the servo data 512. The mux 553 transfers the high-resolution servo position data words to the combiner and memory 552. The combiner and memory 552 concatenates high-resolution servo position data words that are the width of the NRZ bus 535 into the high-resolution servo position data and stores the data in a memory. The memory could be a register array or a first-in first-out memory. The processor 530 obtains the high-resolution servo position data from the combiner and memory 552. The processor 530 uses the high-resolution servo position data to center the heads over the data tracks on the disks.

The sequencer 529 receives timing information from the servo decoder and memory 526 over the line 537. The timing information is derived from the phase-locked-loop field and servo timing mark in the servo data. The sequencer 529 uses the timing information to provide a signal to the signal processor 520, the separator and memory 550, the mux 551, the mux 553, and the combiner and memory 552. The signal indicates when the disk device 502 is reading or writing the user data 511 and when the disk device 502 is reading the servo data 512. The heads do not transfer the user data 511 when they are positioned over the servo data 512. Likewise, the heads do not transfer the servo data 512 when they are positioned over the user data 511. As a result, the NRZ bus 535 does not transfer the user data 511 when the disk device 502 is reading the servo data 512. A programmable servo burst sequencer used in a sampled servo system is described in U.S. Pat. No. 5,684,972 to Hill et al. U.S. Pat. No. 5,684,972 to Hill et al. is hereby incorporated by reference into this application.

The mux 551 selects the clock signal 534. When the user data 511 is transferred over the NRZ data bus 535, the clock signal 534 is synchronized to the NRZ data bus 535. When the servo data 512 is transferred over the NRZ data bus 535, the clock signal 534 originates in the separator and memory 550 and is synchronized to the servo data 512 on the NRZ bus 535. The clock signal 534 is used to gate the servo data 512 into the combiner and memory 552.

Figure 6:
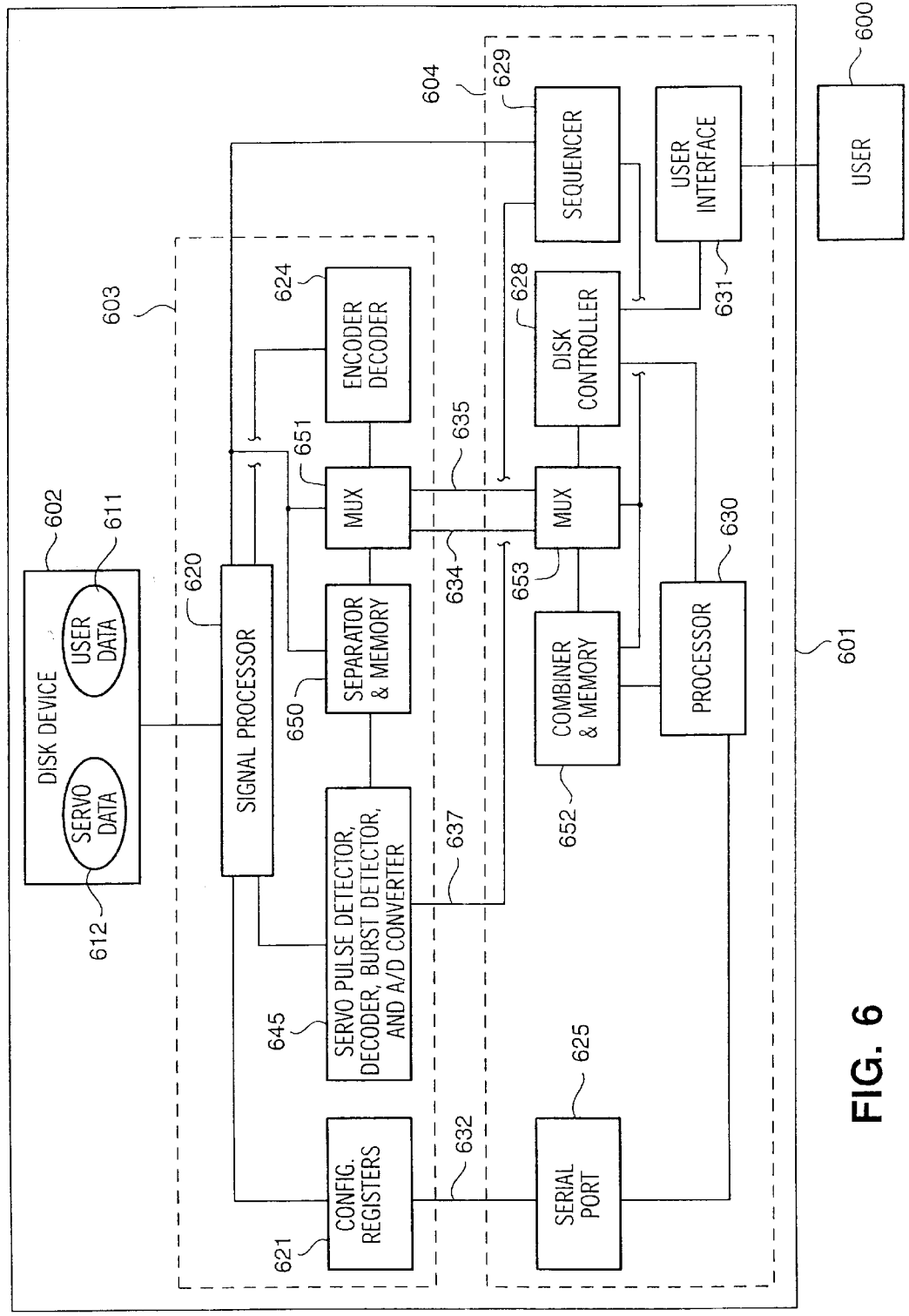
FIG. 6 is a block diagram of a version of the invention and depicts a read channel integrated circuit and a drive control integrated circuit.

High-Speed Transfer of Coarse and High Resolution Servo Position Data—FIG. 6

FIG. 6 depicts a user 600 coupled to a disk drive system 601 that is configured in accord with the present invention. Components that are similar to those described above retain the same last two digits of the reference number. The disk drive system 601 transfers both course-resolution and high-resolution servo position data over the high-speed NRZ bus 635. The use of the high-speed NRZ bus 635 eliminates the need for costly analog pins and pulse/polarity lines to transfer the servo position data. The high-speed NRZ bus 635 transfers the data faster than the serial interface 632 to improve system performance.

The disk device 602 stores user data 611 and servo data 612. The read channel integrated circuit 603 comprises signal processor 620, configuration registers 621, servo pulse detector, decoder, burst detector, and AID converter element 645, separator and memory 650, mux 651, and endec 624. The drive control integrated circuit 604 comprises serial port 625, combiner and memory 652, mux 653, disk controller 628, sequencer 629, processor 630, and user interface 631. The read channel integrated circuit 603 and the drive control integrated circuit 604 are connected by a serial interface 632, clock signal 634, and NRZ bus 635, and timing information line 637.

In operation, the signal processor 620 receives a read signal that contains the user data 611 and the servo data 612 from the disk device 602. The signal processor 620 transfers the user data 611 to the endec 624. The endec 624 transfers the user data 611 to the mux 651. When the disk device 602 is reading the user data 611, the mux 651 transfers the user data 611 to the mux 653 over the NRZ bus 635. The mux 653 transfers the user data 611 to the disk controller 628. The disk controller 628 forwards the user data 611 to the user 600 though the user interface 631. The user data 611 is transferred from the user 600 to the disk device 602 in a reciprocal manner where the mux 653 transfers the user data 611 to the mux 651 over the NRZ bus 635 when the disk device 602 is writing the user data 611.

The signal processor 620 transfers the servo data 612 in the read signal to the servo pulse detector, decoder, burst detector, and A/D converter element 645. The element 645 demodulates the servo data 612. The element 645 decodes the coarse-resolution servo position data. The element 645 also provides digital high-resolution servo position data. The element 645 either detects analog servo bursts and converts the results to digital information, or the element 645 over-samples the servo bursts with an A/D converter and uses a digital signal processor to detect the servo bursts from the digital signal produced by the over-sampling. In either case, the element 645 transfers the coarse-resolution and high-resolution servo position data to the separator and memory 650. The separator and memory 650 separates the servo position data into data words that are the width of the NRZ bus 635 and stores the data words in a memory.

The mux 651 obtains the data words containing the servo position data from the separator and memory 650. The mux 651 transfers the servo position data words to the mux 653 over the NRZ bus 635 when the disk device 602 is reading the servo data 612. The mux 653 transfers the servo position data words to the combiner and memory 652. The combiner and memory 652 concatenates servo position data words that are the width of the NRZ bus 635 into the coarse-resolution and high-resolution servo position data and stores the data in a memory. The memory could be a register array or a first-in first-out memory. The processor 630 obtains the coarse-resolution and high-resolution servo position data from the combiner and memory 652. The processor 630 uses the coarse-resolution servo position data to position the heads near the desired data tracks, and uses the high-resolution servo position data to center the heads over the data tracks.

The sequencer 629 receives timing information from the element 645 over the line 637. Alternatively, the timing information could be transferred over the NRZ bus 635. The timing information is derived from the phase-locked-loop field and servo timing mark in the servo data. The sequencer 629 uses the timing information to provide a signal to the signal processor 620, the separator and memory 650, the mux 651, the mux 653, and the combiner and memory 652. The signal from the sequencer 629 indicates when the disk device 602 is reading or writing the user data 611 and when the disk device 602 is reading the servo data 612. The heads do not transfer the user data 611 when they are positioned over the servo data 612. Likewise, the heads do not transfer the servo data 612 when they are positioned over the user data 611. As a result, the NRZ bus 635 does not transfer the user data 611 when the disk device 602 is reading the servo data 612.

The mux 651 selects the clock signal 634. When the user data 611 is transferred over the NRZ data bus 635, the clock signal 634 is synchronized to the NRZ data bus 635. When the servo data 612 is transferred over the NRZ data bus 635, the clock signal 634 originates in the separator and memory 650 and is synchronized to the servo data 612 on the NRZ bus 635. The clock signal 634 is used to gate the servo data 612 into the combiner and memory 652.

Those skilled in the art appreciate that some conventional elements of the disk drive systems 501 and 601 in FIGS. 5–6 have been omitted for reasons of clarity. Those skilled in the art can appreciate variations of the above-described embodiments that fall within the scope of the invention. As a result, the invention is not limited to the specific embodiments discussed above, but only by the following claims and their equivalents.

What is claimed is:

1. A read channel integrated circuit that comprises:
   a servo data processor receiving servo data from a read signal, wherein the servo data processor decodes coarse-resolution servo position data in the servo data, identifies analog high-resolution servo position data in the servo data, and converts the analog high-resolution servo position data into digital high-resolution servo position data;
   a port coupled to an external data bus; and
   means coupled to the port for transferring both the digital high-resolution servo position data and user data over the bus port.

2. The read channel integrated circuit of claim 1 wherein the means for transferring is operational to multiplex the user data and the high-resolution servo position data and transfer the multiplexed user data and the high-resolution servo position data to the external data bus.

3. The read channel integrated circuit of claim 1 wherein the means for transferring comprises a multiplexor.

4. The read channel integrated circuit of claim 1 further comprising an encoder/decoder coupled to the port to receive and process user data.

5. The read channel integrated circuit of claim 1 further comprising a memory coupled to the servo data processor that is configured to store the digital high-resolution servo position data.

6. The read channel integrated circuit of claim 1 further comprising means for detecting the high-resolution servo position data from the bus port.

7. The read channel integrated circuit of claim 1 further comprising a separator operational to separate the high-resolution servo position data into data words.

8. The read channel integrated circuit of claim 7 wherein the separator is further operational to separate the decoded coarse-resolution servo position data into the data words, wherein the transferring means is further adapted for transferring the decoded coarse-resolution servo position data, and wherein the data words have a width corresponding to a width of the external data bus.

9. The read channel integrated circuit of claim 1 further comprising means for transferring the decoded coarse-resolution servo position data from the read channel integrated circuit to the data bus.

10. The read channel integrated circuit of claim 9 further comprising means for decoding the coarse-resolution servo position data.

11. The read channel integrated circuit of claim 1 wherein the means for transferring is operational to sequence the user data, the digital high-resolution servo position data, and the decoded coarse-resolution servo position data and transfer the multiplexed user data and the high-resolution servo position data to the external data bus.

12. The read channel integrated circuit of claim 1 wherein the high-resolution servo position data is transferred to the data bus when the disk drive system is not reading or writing the user data.

13. A drive control integrated circuit comprising:
   a port coupled to an external data bus to communicate both user data and high-resolution servo data comprising data words with the external data bus;
   a combiner and memory element coupled to the port to receive the data words of the high-resolution servo data, to concatenate the received data words, and to store the concatenated data words;
   a user interface coupled to communicate the user data with a user; and
   a disk controller coupled to receive the concatenated data words of the high-resolution servo data and generate disk control signals to an external servo controlling position of a read/write head.

14. The drive control integrated circuit of claim 13 further comprising means for detecting when the read/write head is reading or writing user data.

15. The drive control integrated circuit of claim 13 further comprising means coupled to the port for receiving both high-resolution servo position data and user data over the port in a non-conflicting manner based the detection of when the read/write head is reading or writing user data.

16. The drive control integrated circuit of claim 13 further comprising a data processor coupled to the combiner to receive the high-resolution servo data, wherein the data processor uses the high resolution servo position data to control a disk control circuit that controls position of a read/write head.

17. The drive control integrated circuit of claim 13 further comprising a sequencer coupled to receive timing information and generate a signal indicating when an external disk device is reading or writing user data.

18. A read channel integrated circuit comprising:
an encoder/decoder operational to receive and process user data;
a servo burst detector operational to detect high-resolution servo position data;
an analog-to-digital converter coupled to the servo burst detector and operational to convert high-resolution servo position data from analog to digital;
a separator and memory mechanism coupled to the analog-to-digital converter and configured to separate the digital high-resolution data into data words and store the data words of the digital high-resolution servo position data; and
a bus sharing mechanism coupled to the separator and memory mechanism and configured to selectively transfer the data words of the digital high-resolution servo data from the separator and memory mechanism and to selectively transfer user data from the encoder/decoder.

19. The read channel integrated circuit of claim 18, wherein the servo burst detector and the analog-to-digital converter are combined into a single element coupled to the separator and memory mechanism.

20. The read channel integrated circuit of claim 19 wherein the combined element is further functional to detect and decode coarse-resolution servo position data, the decoded coarse-resolution servo position data being transferred to the separator and memory mechanism for storage and transfer by the bus sharing mechanism with the digital high-resolution servo data and the user data.

* * * * *